United States Patent Office 2,732,714
Patented Jan. 31, 1956

2,732,714

MEASUREMENT OF ANNULUS VOLUME IN WELLS

Arthur D. Bennett, Tulsa, Okla., assignor to Stanolind Oil and Gas Company, Tulsa, Okla., a corporation of Delaware Application July 23, 1952, Serial No. 300,464

11 Claims. (Cl. 73—152)

This invention relates to the measurement of wells, and is directed particularly to the measurement of the annulus areas or volumes in the open-hole portions of wells such as those producing oil and gas.

The measurement of average or effective well diameters by such means as calipers having arms that move and maintain contact with three or more points of the well-bore wall is well known. Such measurements are useful in determining annulus volumes, as in estimating the amount of material such as cement needed to fill a given depth of annulus, and in interpreting measurements involving the velocity of fluids moving along the well bore. Where the effective well-bore diameter changes, the fluid velocities are inversely altered, and corrections accordingly are necessary for the proper interpretation of the fluid-velocity data.

Although the measurements of well diameters by arm-type caliper devices have often been used with success, I have found that they are ineffective in some instances. In particular, where the well-bore variations are exceedingly large and very abrupt, the arm-type caliper measurements are inaccurate. Interpretations based on them are not correct to a desirable degree of accuracy. In particular, if the well bore is non-circular in shape, the actual cross-sectional area may be substantially different from that computed using a three or four-point caliper measurement. Arm-type calipers also are limited as to the maximum diameter variations which can be accommodated. Further, it is ordinarily necessary to remove the well tubing string before the caliper instrument can be lowered to the region of interest.

It is accordingly a primary object of my invention to provide an improved method of obtaining the cross-sectional area variations of well bores. Another object is to obtain accurate measurements of such well-bore variations without removing the well tubing from a well. A further object is to provide a method of making such measurements which is independent of the cross-sectional shape of the well bore, giving volumetric data which are as accurate for irregular as for circular shapes. A still further object is to provide a method of measuring well-bore cross-sections which gives accurate results regardless of how abruptly, or between what limits, the effective well diameter may vary. Other objects, uses, and advantages of the invention will become apparent as the description proceeds.

In brief, the foregoing and other objects are accomplished by following through the well bore a marker within a fluid column or an interface between two fluid columns while maintaining the well at a non-producing or static equilibrium. Thus, fluid is removed from the bottom of a well bore, by means such as a well pump, at exactly the same rate on a weight basis, as additional fluid is introduced into the well annulus from the surface, and a marker or interface in the well annulus is followed as it moves downwardly through the well bore. By maintaining the rate of removal and introduction of fluid at constant or known values, the bottom-hole pressure does not vary from its value at static equilibrium, so that variations in the interface velocity are directly interpretable in terms of well cross-sectional area variations.

This will be better understood by reference to the accompanying drawings forming a part of this application and illustrating an embodiment of the invention, together with typical results obtained thereby. In these drawings:

Figure 4 shows logs of actual fluid velocities as a function of depth in the well referred to in Figure 3, as recorded and as corrected by various methods.

Figure 1:
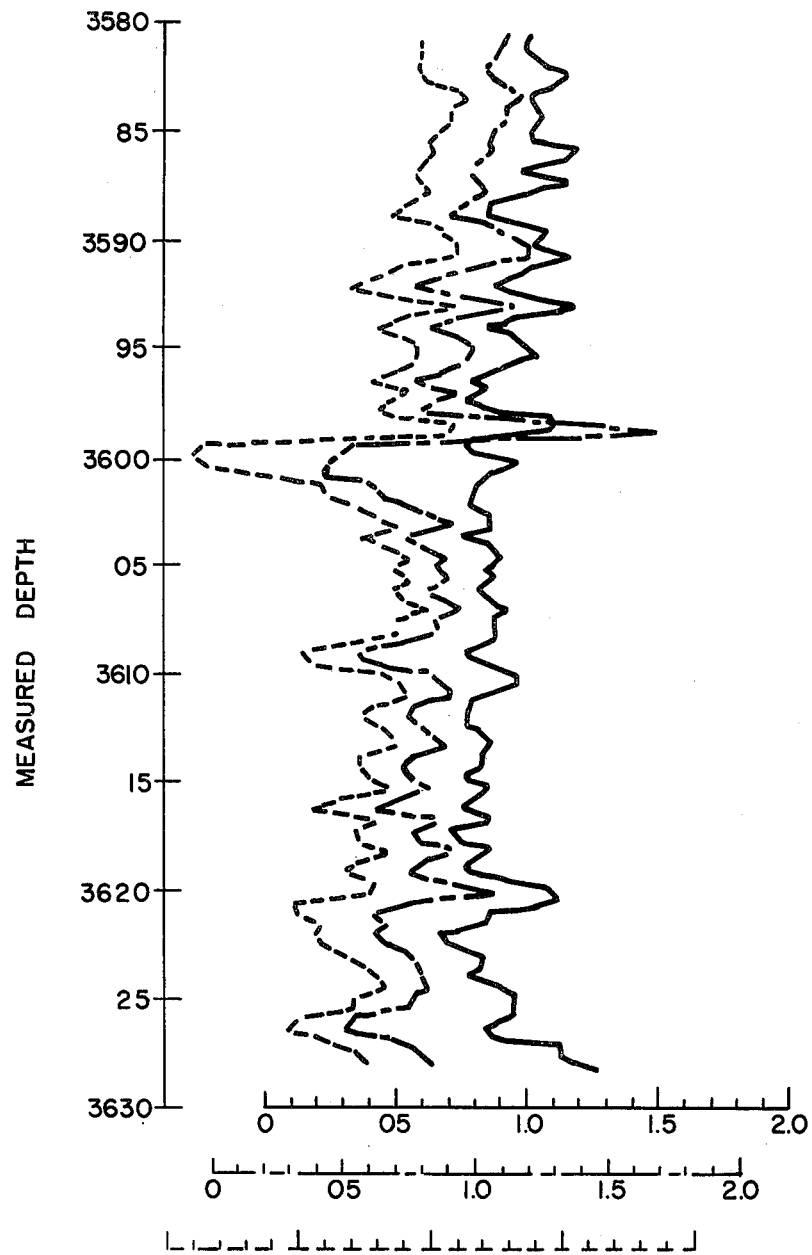
Figures 1 and 2 are cross-sectional views of a well and the fluids therein, respectively immedately prior to and during the running of an annulus volume survey according to the invention.

Referring now particularly to Figure 1, a well 10 is shown as equipped with a casing 11, cemented as indicated at the depth 12, and provided with a tubing 13 extending close to the well bottom and carrying a pump 14 operated from the surface by a sucker rod 15. It will be assumed that the problem is to determine the variations in diameter of the open hole portion 16 of the well 10 below the casing seat 12.

This is accomplished, in accordance with my invention, by providing at the ground surface 20 a supply tank 21 of liquid, which may be introduced into the well annulus 22 between casing 11 and tubing 13 at a rate controlled by an adjustable valve 23.

Prior to the time well 10 is in the condition shown in Figure 1 it will have been allowed to come to a condition of static equilibrium by discontinuing pumping by pump 14 for an extended period of time. At the end of this period of time, the well formations will have produced into annulus 22 a quantity of fluids sufficient to fill the annulus to some depth such as the level 24, which is termed the static fluid level for the particular well 10. If it be assumed that the well 10 produces both oil and water, the fluid column will be composed of a lower body 25 of water and an upper body 26 of oil, separated by a sharp and distinct interface 27 extending horizontally across the well bore.

Often this interface 27 will not be at the position shown in Figure 1 in the annulus between casing 11 and tubing 13, but at some point within the open-hole portion 16 of the well 10. For the purpose of this invention, however, it is necessary that the interface 27 be above the region of interest in the well and preferably in the cased portion thereof, as shown in Figure 1. If necessary, this interface is raised by first pumping the well 10 down below the static fluid level 24 for some distance, and introducing additional water into the annulus 22 from the surface in the manner taught, for example, in U. S. Patent 2,595,578 or U. S. Patent 2,595,610.

Briefly, as disclosed in these patents, an elongated water column 25 of nearly any required length may be obtained by introducing water from the surface 20 into the annulus 22 at a somewhat lesser rate than fluid is removed from the well by pump 14, and allowing the introduced water to fall through the body of oil 26 and consolidate at the bottom of the well 10 into a solid column 25. Shutting the well in for a period of time then completely restores the desired static equilibrium condition. As the particular manner in which the water column 25 extending throughout section 16 and into the space between casing 11 and tubing 13 is established is not important in the present invention, further description of this portion of the well prepartion is not deemed necessary.

Figure 2:
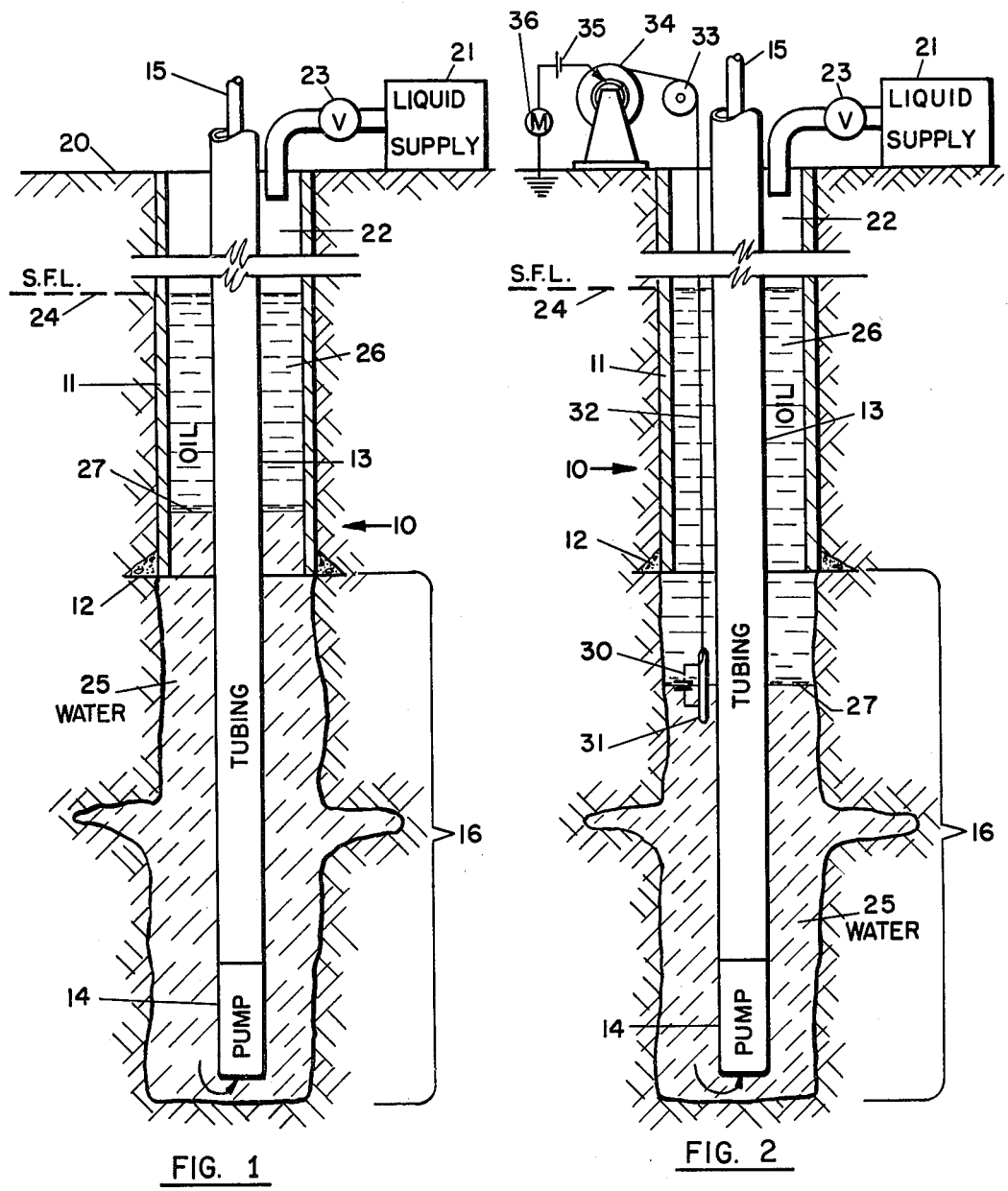

Assuming therefore that the well 10 is at static equilibrium with interface 27 about casing seat 12, the measuring process of the invention is begun. Pump 14 is started, to remove fluid from the bottom of open hole portion 16 at some given rate, as by operating sucker rod 15, and, substantially simultaneously, valve 23 is opened to admit liquid from supply tank 21 into annulus 22 at as nearly as possible the same rate, on a weight basis. As shown in Figure 2, a pair of fluid-conductivity measuring electrodes 30, mounted on a carrier 31, is lowered into annulus 22 on an insulated-conductor cable 32, which passes over a sheave 33 from a supply reel 34 at the ground surface 20. One of electrodes 30 is connected to the insulated conductor of cable 32, while the other is connected to the metallic carrier 31, and thence to ground through the intervening conducting fluids in which carrier 31 is immersed. An electrical circuit taken from supply reel 34 by suitable slip rings through a battery 35 and indicating meter 36 connected in series to ground completes the circuit through the electrode pair 30. With this arrangement, it will be seen that the current flow through the circuit and meter 36 will be principally determined by the fluid between electrodes 30, and will thus clearly indicate whether the electrodes are above interface 27 and immersed in oil 26, or below the interface and in water 25.

With valve 23 being carefully adjusted to admit liquid from supply 21 into the top of annulus 22 at exactly the same rate on a weight basis as liquid is removed by pump 14 from the bottom of well 10, the bottom-hole pressure remains constant, so that the permeable formations neither produce fluids into nor remove them from the well bore. Consequently, interface 27 moves downwardly through the well bore and is followed by electrodes 30.

By observing the interface velocity carefully while it is still above casing seat 12 the volumetric efficiency of pump 14 may be accurately determined from an accurate knowledge of the volume of annulus 22 between the tubing and casing. As interface 27 moves past the bottom of casing 11 and travels downwardly through the open-hole portions 16 to the inlet of pump 14, data are recorded from which its velocity, as a function of position or depth can be determined. Thus, there may be recorded the length of time required for the interface to travel each known interval of depth, from which its average velocity through the interval is calculated. The velocity-depth log so obtained can be used directly in the correction of fluid-velocity data subsequently obtained, or it can be converted by calculation into an effective well-diameter log such as is represented by the solid-line curve of Figure 3. In such a calculation, the cross-sectional area of the tubing 13 is taken into account as a part of the total cross-sectional area of the open-hole portion 16.

Figure 3:
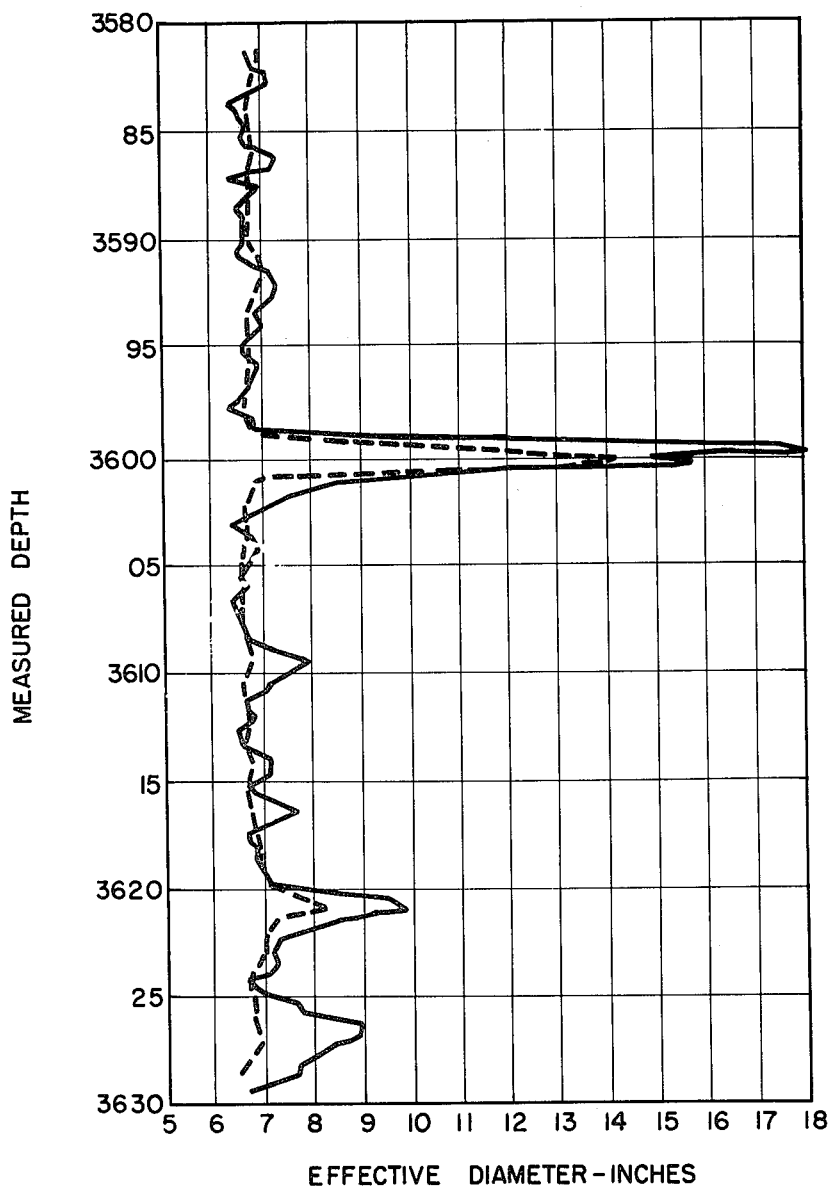
Figure 3 shows two logs of effective diameter as a function of depth in an actual well.

In Figure 3 are shown corresponding depth-diameter logs in an actual well, in which a comparison was made between conventional arm-type calipering and the measurement of bore-hole size variations by the present invention. In this figure, the dotted line is a log of the effective well diameter vs. depth which was obtained by a three-point mechanical caliper. It will be noticed that the largest hole diameter indicated was between 13 and 14 inches, at a depth of about 3599. The solid line, on the other hand, is a computed log made from data recorded according to the present invention, and this shows a maximum diameter at this depth of nearly 18 inches. Furthermore, this diameter change, as indicated by the fluid-interface data, is extremely abrupt. Thus, the difference in shape between the dotted and solid line curves at this depth is significant, demonstrating not only the fact that the mechanical caliper failed to probe to the full diameter of the hole, but also it was unable to respond to the extremely abrupt change at the upper edge of the hole enlargement. This is characteristic of caliper logs made using arms extending obliquely outwardly to the well wall from an instrument at the center of the bore.

The minor variations in the solid-line curve will be understood when it is recalled that this is a computed rather than an actually recorded curve based on the lengths of time consumed for the interface to travel over given intervals of depth. Thus, part or most of the minor variations can be explained by minor inaccuracies in the timing of the interface travel or in the positioning of the interface-determining electrodes 30. Besides the discrepancy between the solid and dotted-line logs at 3599, it is believed that the differences observed at 3609, 3621, and 3627 are all significant of hole-size variations inadequately indicated by the arm-type caliper.

Turning now to Figure 4, three curves are shown of oil-water interface velocities as a function of depth which were subsequently made in the well whose diameter variations are plotted in Figure 3. To avoid confusion and overlapping these curves have been horizontally offset from each other as indicated by the three abscissa lines. The dotted-line curve to the left, referred to the lowermost abscissa line, is the actual velocity of the oil-water interface taken during a fluid-production test, without applying any corrections thereto for the diameter variations. The abnormally low velocity at 3599 attributable to the considerable hole enlargement at this depth, is most clearly apparent.

The dot-dash curve, referred to the center abscissa line, is the oil-water interface velocity corrected on the basis of the arm-type caliper log shown as the dotted line of Figure 3. The effect of the hole enlargement at 3599 is still clearly visible on this curve, both as an abnormally low velocity, and as an abnormally high velocity in the upper portion of this enlargement where the caliper arms failed to probe either accurately or sufficiently far.

The solid-line curve of Figure 4, on the other hand, is the curve corresponding to the recorded data corrected according to the fluid-interface measurements shown as the solid-line log of Figure 3. It will be apparent that substantially all of the anomaly at depth 3599 due to the hole enlargement has been eliminated from this curve, as the variations remaining thereon are not signficantly greater than those at other parts of the curve. This curve, in general, confirms data obtained from other measurements as to the locations where fluid flow to or from the formations occurs in the well. Corrections made according to this invention thus assist the proper interpretation of fluid-velocity curves in well bores where the velocity is affected both by the well diameter and by the formations which may produce or take fluid from the well bore.

Although the invention has been illustrated by reference to a sharp interface 27 such as is formed between water 25 and oil 26, other types of interfaces can be and have been successfully used. For instance, instead of oil as the upper body 26, it has been satisfactory in some cases involving measurements in water-input wells where the presence of oil was not desired, to use a column of fresh water above a column of salt water filling the bottom portion of the well bore. Although the interface between the salt water and fresh water is not as sharp as between water and oil, nevertheless, due to the difference in specific gravity of the two liquids, the zone of mixing remains quite narrow and can be as satisfactorily followed by electrical conductivity measurements as the interface illustrated.

The liquid which is introduced from supply 21, into the annulus 22 at the surface, may be either water or oil in cases where the oil column 26 is long enough that the introduced water does not fall completely through the oil column and enter the water column during the time of making the measurements. The use of water rather than oil may, in fact, simplify the problem to the extent that it is unnecessary to take account of the difference in density between oil and water in adjusting the volume of flow through the valve 23, and all that is required is flow at the same volumetric rate as the production of water by pump 14.

While it is desirable to maintain the pump production at a constant rate throughout the test, it is not necessary that this be done as long as the rate is known, and the rate of liquid introduction through the valve 23 is equal, on a weight basis. While it is desirable also to have the well at as nearly static equilibrium as possible throughout the measurements, it is not essential that this be so if the amount of fluid produced from or forced into the well formations is small compared to the amount of fluid lifted by pump 14 and being introduced into annulus 22 through valve 23. Thus, if the differential pressure between the top and the bottom of open-hole section 16 is slightly different from that existing under natural conditions in a producing reservoir, due to the fact that the open-hole portion of the well bore is completely filled with salt water instead of partly with salt water and partly with oil, this difference generally does not produce a significant error in the interface measurements, as the errors in measurement of the interface depth or in the timing of its travel across given depth intervals may be greater than the effect of the small variations in the bottom-hole pressure or the differential pressures between different formations exposed in the well bore.

Although an interface between two fluid columns is preferred in this invention because it is easy to follow and long-lasting, I have on occasions successfully followed markers, such as small amounts of salt water spotted in a column of fresh water, over substantial distances, and where the diameter changes were not excessively large and abrupt. The velocity variations of such markers correspond generally to the velocity variations of true interfaces.

While I have thus described my invention in terms of the foregoing specific details and embodiments, it is to be understood that further modifications will be apparent to those skilled in the art. The scope of the invention, therefore, should not be considered as limited to the specific details set forth but is to be ascertained from the appended claims.

I claim:

1. The method of determining variations in cross-sectional area of a well bore with depth in said bore which comprises the steps of positioning an identifiable marker in a liquid column in said bore, said liquid column being of a height to maintain the well formations substantially at a condition of static equilibrium, introducing liquid at a known rate into said column at one depth, withdrawing liquid from said column at another depth at the same rate on a weight basis as said known rate, said depths being so located that said marker and a zone of interest lie between them, whereby said marker is caused to move past said zone of interest while said condition of substantial static equilibrium is maintained, and recording as function of depth data indicative of the velocity of said marker.

2. The method of claim 1 wherein said marker is the interface between two liquid columns.

3. The method of claim 2 wherein the movement of said interface is downward.

4. The method of determining variations in cross-sectional area with depth in a well bore containing a liquid column of sufficient height to maintain the well formations substantially at a condition of static equilibrium, which method comprises the steps of establishing an identifiable marker in said liquid column, introducing a first liquid into said column at a substantially constant rate at one depth, withdrawing a second liquid from said column at another depth at a substantially equal constant rate on a weight basis, said depths being so located that said marker and a zone of interest lie between them, whereby a body of liquid containing said marker is caused to move past said zone of interest while said condition of substantial static equilibrium continues to exist, and recording the lengths of time required by said marker to traverse known depth intervals in said zone.

5. The method of claim 4 wherein said marker is an interface between an upper column of oil and a lower column of water.

6. The method of claim 4 wherein said marker is an interface between two columns of water of different salinity.

7. The method of claim 4 wherein the motion of said liquid and marker is downward.

8. The method of determining variations in cross-sectional area of a well bore with depth in said bore which comprises the steps of positioning a marker in the well-bore liquid column at a depth above a zone of interest, permitting the well formations to come substantially to static equilibrium, simultaneously withdrawing liquid from said column at a point below said zone and introducing liquid into said column above said zone at equal rates on a weight basis, whereby said marker moves downwardly through said zone while said formations remain substantially at static equilibrium, following said marker through said zone, and recording indications of the velocity of movement of said marker as a function of depth.

9. The method of claim 8 in which said marker is an oil-water interface and the liquid introduced above said zone is oil.

10. The method of claim 8 in which said marker is a boundary between columns of water of different salinity and the liquid introduced above said zone is water.

11. The method of determining variations in cross sectional area of a well bore with depth in said bore which comprises establishing an oil-water interface in the well annulus surrounding a well tubing at a depth above the open-hole portion of said bore, permitting the well formations to produce or take fluids until a condition of static equilibrium is substantially reached, pumping said well at a given constant rate through said tubing from a point near the well bottom while simultaneously introducing liquid at substantially the same rate on a weight basis into the well annulus at the surface, whereby the well formations remain substantially at static equilibrium while said interface moves downwardly, and recording the lengths of time for said interface to traverse known intervals of depth in said bore.

References Cited in the file of this patent

UNITED STATES PATENTS

| 2,235,770 | McConnell | Mar. 18, 1941 |
| 2,344,771 | Halliburton | Mar. 21, 1944 |
| 2,557,488 | White | June 19, 1951 |
| 2,674,877 | Silverman et al. | Apr. 13, 1954 |